(12) United States Patent
Young et al.

(10) Patent No.: US 9,959,444 B2
(45) Date of Patent: May 1, 2018

(54) FINGERPRINT SENSOR UNDER THIN FACE-SHEET WITH APERTURE LAYER

(71) Applicant: Synaptics Incorporated, San Jose, CA (US)

(72) Inventors: Hong G. Young, San Jose, CA (US); Raymond Chin, Santa Clara, CA (US); Eric Jones, Santa Cruz, CA (US); Kelvin Fong, Milpitas, CA (US)

(73) Assignee: Synaptics Incorporated, San Jose, CA (US)

( * ) Notice: Subject to any disclaimer, the term of this patent is extended or adjusted under 35 U.S.C. 154(b) by 85 days.

(21) Appl. No.: 15/255,037

(22) Filed: Sep. 1, 2016

(65) Prior Publication Data

US 2017/0061193 A1    Mar. 2, 2017

Related U.S. Application Data

(60) Provisional application No. 62/213,293, filed on Sep. 2, 2015.

(51) Int. Cl.
*G06K 9/00* (2006.01)
*G06F 3/041* (2006.01)

(52) U.S. Cl.
CPC .......... *G06K 9/00013* (2013.01); *G06F 3/041* (2013.01)

(58) Field of Classification Search
CPC ............................ G06F 3/041; G06K 9/00013
See application file for complete search history.

(56) References Cited

U.S. PATENT DOCUMENTS

| | | | |
|---|---|---|---|
| 2009/0257626 A1* | 10/2009 | Sherlock | G06K 9/00013 382/126 |
| 2012/0242635 A1* | 9/2012 | Erhart | G06F 1/1626 345/207 |
| 2013/0169590 A1 | 7/2013 | Wickboldt et al. | |
| 2015/0363629 A1 | 12/2015 | Lee et al. | |
| 2015/0371076 A1 | 12/2015 | Lee et al. | |
| 2016/0004899 A1* | 1/2016 | Pi | G06F 1/1626 345/173 |
| 2016/0077622 A1* | 3/2016 | Lee | G06F 1/1626 345/173 |

FOREIGN PATENT DOCUMENTS

CN            203117936        8/2013

* cited by examiner

*Primary Examiner* — Muhammad N Edun
(74) *Attorney, Agent, or Firm* — Leydig, Voit & Mayer Ltd.

(57) ABSTRACT

An input device for fingerprint sensing and proximity sensing includes a cover layer, where a top surface of the cover layer is configured to provide an input surface for a finger, a substrate having a cavity disposed below the cover layer, and a fingerprint sensor disposed below the cover layer and in the cavity of the substrate. A first adhesive layer is disposed between a top surface of the fingerprint sensor and a bottom surface of the cover layer in a fingerprint sensing area. A second adhesive layer is disposed between a top surface of the substrate and the bottom surface of the cover layer in a proximity sensing area.

25 Claims, 7 Drawing Sheets

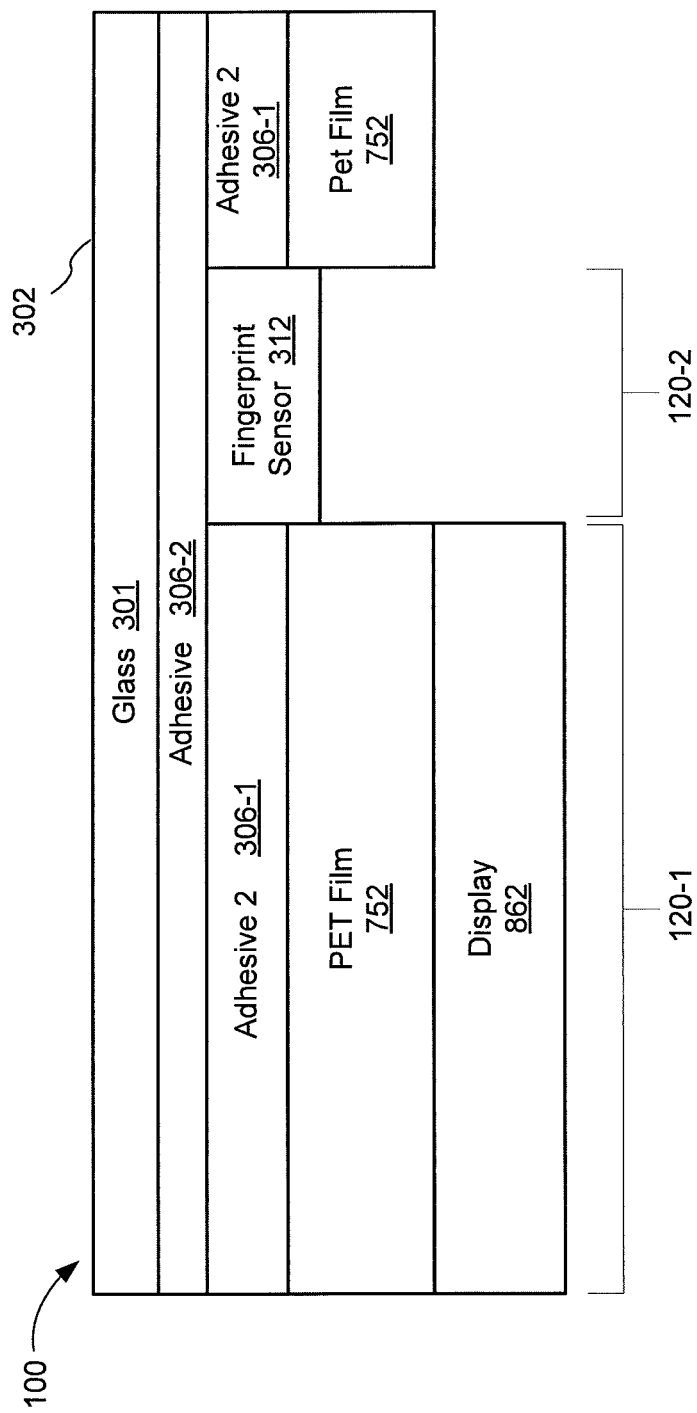

FINGERPRINT SENSOR UNDER THIN FACE-SHEET WITH APERTURE LAYER

CROSS-REFERENCE TO RELATED APPLICATIONS

This application claims priority to U.S. provisional patent application No. 62/213,293, filed on Sep. 2, 2015, the entire contents of which is hereby incorporated by reference in its entirety.

TECHNICAL FIELD

This disclosure generally relates to electronic devices.

BACKGROUND

Input devices including proximity sensor devices (also commonly called touchpads or touch sensor devices) are widely used in a variety of electronic systems. Input devices also include fingerprint sensors and other biometric sensor devices. A sensor device typically includes a sensing region, often demarked by a surface, in which the sensor device determines the presence, location, motion, and/or features of one or more input objects. Sensor devices may be used to provide interfaces for the electronic system. For example, sensor devices are often used as input devices for larger computing systems (such as opaque touchpads and fingerprint sensors integrated in, or peripheral to, notebook or desktop computers). Sensor devices are also often used in smaller computing systems (such as touch screens integrated in cellular phones).

SUMMARY

One embodiment of the disclosure provides an input device for fingerprint sensing and proximity sensing. The input device includes: a glass cover layer, wherein a top surface of the glass cover layer is configured to provide an input surface for a finger; a printed circuit board disposed below the glass cover layer, the printed circuit board comprising a cavity; a fingerprint sensor disposed below the glass cover layer and disposed in the cavity of the printed circuit board layer; a first adhesive layer disposed between a top surface of the fingerprint sensor and a bottom surface of the glass cover layer, the first adhesive layer being disposed in a fingerprint sensing area that is within an area of the cavity; and, a second adhesive layer disposed between a top surface of the printed circuit board and the bottom surface of the glass cover layer, the second adhesive layer being disposed in a proximity sensing area that is outside of the area of the cavity.

Another embodiment of the disclosure provides an input device for fingerprint sensing and proximity sensing. The input device includes: a cover layer, wherein a top surface of the cover layer is configured to provide an input surface for a finger; a substrate disposed below the cover layer, the substrate comprising a cavity; a fingerprint sensor disposed below the cover layer and disposed in the cavity of the substrate; a first adhesive layer disposed between a top surface of the fingerprint sensor and a bottom surface of the cover layer, the first adhesive layer being disposed in a fingerprint sensing area that is within an area of the cavity; and, a second adhesive layer disposed between a top surface of the substrate and the bottom surface of the cover layer, the second adhesive layer being disposed in a proximity sensing area that is outside of the area of the cavity.

BRIEF DESCRIPTION OF DRAWINGS

The preferred exemplary embodiments of the present disclosure will hereinafter be described in conjunction with the appended drawings, where like designations denote like elements, and:

FIG. 8 is another example view of an input device, according to one embodiment of the current disclosure.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding technical field, background, summary, or the following detailed description.

Various embodiments of the present disclosure provide input devices and methods that facilitate improved usability.

Figure 1:
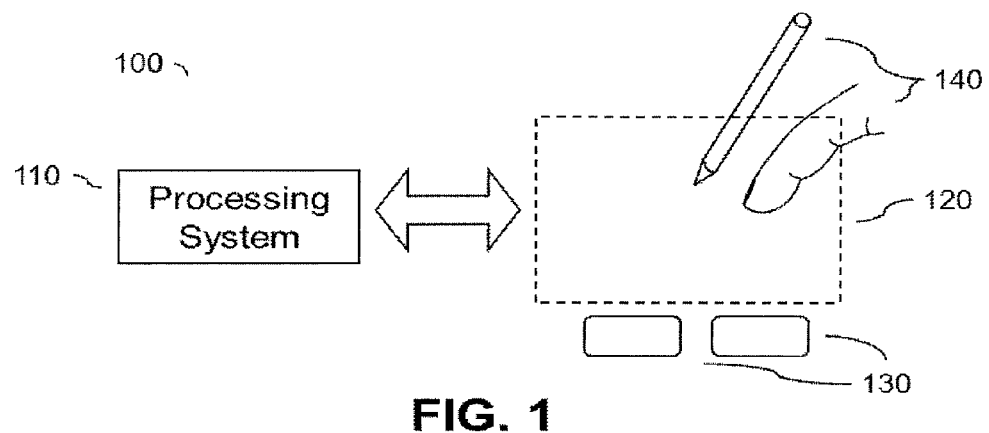
FIG. 1 is a block diagram of an example system that includes an input device, in accordance with an embodiment of the disclosure.

Turning now to the figures, FIG. 1 is a block diagram of an example input device 100, in accordance with embodiments of the disclosure. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include Inter-Integrated Circuit (I²C), Serial Peripheral Interface (SPI), PS/2, Universal Serial Bus (USB), Bluetooth®, radio frequency (RF), and Infrared Data Association (IrDA).

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1. In one embodiment, the input device 100 is a fingerprint sensor that senses the different features in a finger such as ridges and valleys which can be used to form a fingerprint. The fingerprint sensor may be a swipe sensor, where a fingerprint image is reconstructed from a series of scans as the user moves her finger over the sensor, or a placement sensor, where a sufficient area of the fingerprint can be captured from a single scan as the user holds her finger at a fixed location in the sensing region 120. In another embodiment, the sensing region 120 is configured as a proximity sensor and a fingerprint sensor. In such an embodiment, the proximity sensor and fingerprint may share the sensing region 120 or may have dedicated space for sensing proximity events and fingerprint features.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes. Further, some implementations may be configured to provide a combination of one or more images and one or more projections.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects. The reference voltage may by a substantially constant voltage or a varying voltage and in various embodiments; the reference voltage may be system ground.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage to transmit transmitter signals. Receiver sensor electrodes may be held substantially constant relative to the reference voltage to facilitate receipt of resulting signals. The reference voltage may by a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. Further, a processing system for a self capacitance sensor device may comprise driver circuitry configured to drive absolute capacitance signals onto sensor electrodes, and/or receiver circuitry configured to receive signals with those sensor electrodes. In one more embodiments, a processing system for a combined mutual and self capacitance sensor device may comprise any combination of the above described mutual and self capacitance circuitry. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a computing device, and the processing system 110 may comprise software configured to run on a central processing unit of the computing device and one or more ICs (perhaps with associated firmware) separate from the central processing unit. As another example, the input device 100 may be physically integrated in a mobile device, and the processing system 110 may comprise circuits and firmware that are part of a main processor of the mobile device. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes. In one or more embodiments, a first and second module may be comprised in separate integrated circuits. For example, a first module may be comprised at least partially within a first integrated circuit and a separate module may be comprised at least partially within a second integrated circuit. Further, portions of a single module may span multiple integrated circuits.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. In various embodiments, one or more display electrodes of a display device may configured for both display updating and input sensing. As another example, the display screen may be operated in part or in total by the processing system 110.

While many embodiments of the disclosure are described in the context of a fully functioning apparatus, the mechanisms of the present disclosure are capable of being distributed as a program product (e.g., software) in a variety of forms. For example, the mechanisms of the present disclosure may be implemented and distributed as a software program on information bearing media that are readable by electronic processors (e.g., non-transitory computer-readable and/or recordable/writable information bearing media readable by the processing system 110). Additionally, the embodiments of the present disclosure apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
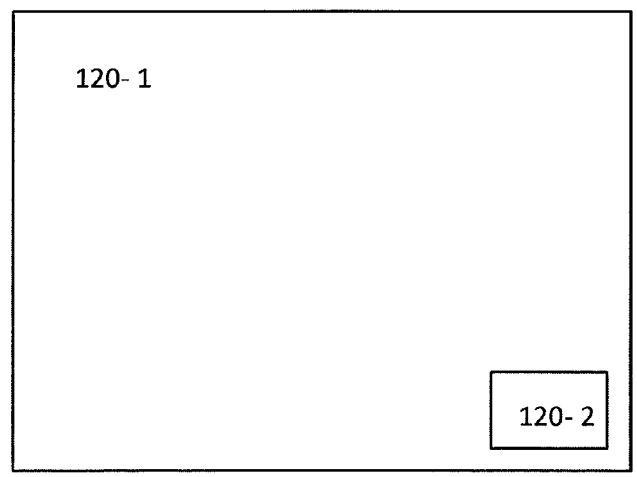
FIG. 2 is a diagram of an example input device having distinct sensing regions, according to an embodiment of the current disclosure.

In one embodiment of the present disclosure, the input device 100 comprises a proximity sensor and a fingerprint sensor. FIG. 2 shows a sensing region (such as, for example, sensing region 120 in FIG. 1) having two sub-sensing regions. Specifically, the sensing region comprises an area for proximity sensing (120-1) and an area for fingerprint sensing (120-2). In one embodiment, where the combined proximity sensor and fingerprint sensor input device is disposed in an electronic system such as a laptop, the input device provides the combined functionality of pointing (commonly associated with proximity sensors) in area 120-1 and a dedicated region for sensing fingerprint information in area 120-2. In some embodiments, the fingerprint sensing area 120-2 may overlap with the proximity sensing area 120-1. In other embodiments, the fingerprint sensing area 120-2 and proximity sensing area 120-1 may be distinct, where pointing functionality is not available from the input device in the fingerprint sensing region 120-2.

Figure 3:
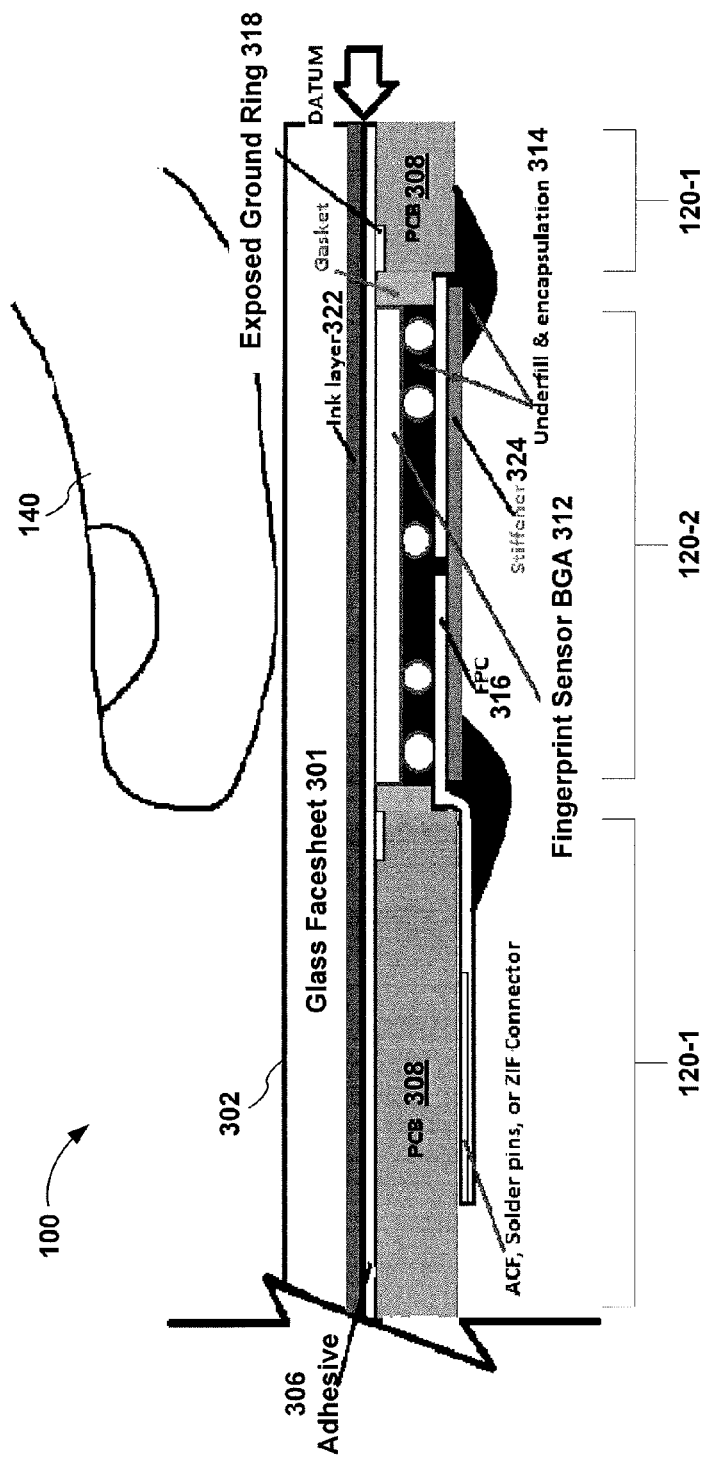
FIG. 3 is a profile view of an example input device, according to an embodiment of the current disclosure.

It is an object of the present disclosure to provide an input device configured to perform proximity sensor functionality and biometric sensor functionality in a combined sensor module. FIG. 3 shows one embodiment of a combined proximity and biometric input device 100. As seen in FIG. 3, which is a cross-section of an input device 100 according to the embodiment in FIG. 2, the input device comprises a touch sensor and a biometric sensor.

More specifically, the embodiment of FIG. 3 comprises:
  a. A cover layer 301 ("Glass Facesheet");
  b. An adhesive layer 306 ("Adhesive");
  c. A PET Film Layer (not shown);
  d. A printed circuit board 308 ("PCB") having an array of touch sensor electrodes (not shown);
  e. A fingerprint sensor 312 ("Fingerprint Sensor BGA");
  f. A potting compound 314 ("Underfill & Encapsulation");
  g. A flexible printed connector 316 ("FPC"); and
  h. An electro static discharge electrode 318 ("Exposed Ground Ring").

The embodiment of FIG. 3 comprises a glass cover layer 301 ("Glass Facesheet") comprising a printed ink layer 322 on its bottom surface ("ink layer") and an input surface 302 for a finger 140 at its top surface. In this embodiment, a PET Film layer (not shown) is adhered to the bottom surface of the cover layer 301 using an adhesive 306. Specifically, the adhesive 306 is a High Modulus Adhesive (e.g., having a Young's Modulus greater than about 250 MPa) having low shrinkage properties and a low CTE (coefficient of thermal expansion).

In another embodiment, the input device 100 comprises glass cover layer 301 ("Glass Facesheet"). The adhesive 306 comprises an optically clear adhesive (OCA) coupling a PET Film to the bottom of the cover layer 301. The PET Film comprises an "ink layer" 302 disposed on the film, where the "ink layer" 302 is configured to provide some opaqueness or decorative cosmetic features to outline the fingerprint sensor 312 on the input surface (visible to a user through the OCA and transparent cover layer 301). In this embodiment, the optically clear adhesive is a High Modulus Adhesive (e.g., having greater than about 250 MPa) having low shrinkage properties and a low CTE (coefficient of thermal expansion).

With continued reference to FIG. 3, the input device 100 described therein provides several benefits. First, the fingerprint sensor 312 and proximity sensor 308 are coupled a planar datum comprising the cover layer 301, the PET Film layer, and the adhesive layer 306. As a result, the assembly of the input device 100 is more easily accomplished by adhering and assembling components to a low tolerance plane. Second, the total thinness of the layers above the fingerprint sensor 312 is adequate to achieve acceptable Signal to Noise rations (SNR) for operation of the fingerprint sensor 312. For example, the total thickness of substrates and materials above the fingerprint sensor 312 can be in the range of 0.10-0.30 millimeters. Third, the cavity formed in the PCB layer 308 provides a space for mounting and securing the fingerprint sensor 312 as well as providing an ESD protection path on the PCB for the fingerprint sensor.

In some alternative embodiments of the present disclosure, the fingerprint sensor 312 may comprise a BGA (ball grid array) package, an LGA (land grid array) package, and an aQFN (advanced Quad Flat No-Lead) package, a COF (Chip on Flex) package. While the fingerprint sensor is shown as a BGA-type capacitive fingerprint sensor in FIG. 3, in various embodiments fingerprint sensor may be any suitable type, including silicon sensor, placement or touch-type sensor, swipe or slide type sensor, capacitive sensor, ultrasonic sensor, optical sensor, and the like. In other alternative embodiments, the PET film layer may be a printed ink layer to provide some opaqueness or decorative cosmetic features to outline the fingerprint sensor on the input surface. In some embodiments, the PET film layer may be a naturally opaque layer (e.g., Mylar™). In other alternative embodiments, a stiffener 324 may be disposed beneath the fingerprint sensor 312 to provide structural rigidity to the total input device and prevent cracking of the cover layer 301, as will be discussed in more detail below.

Figure 4:
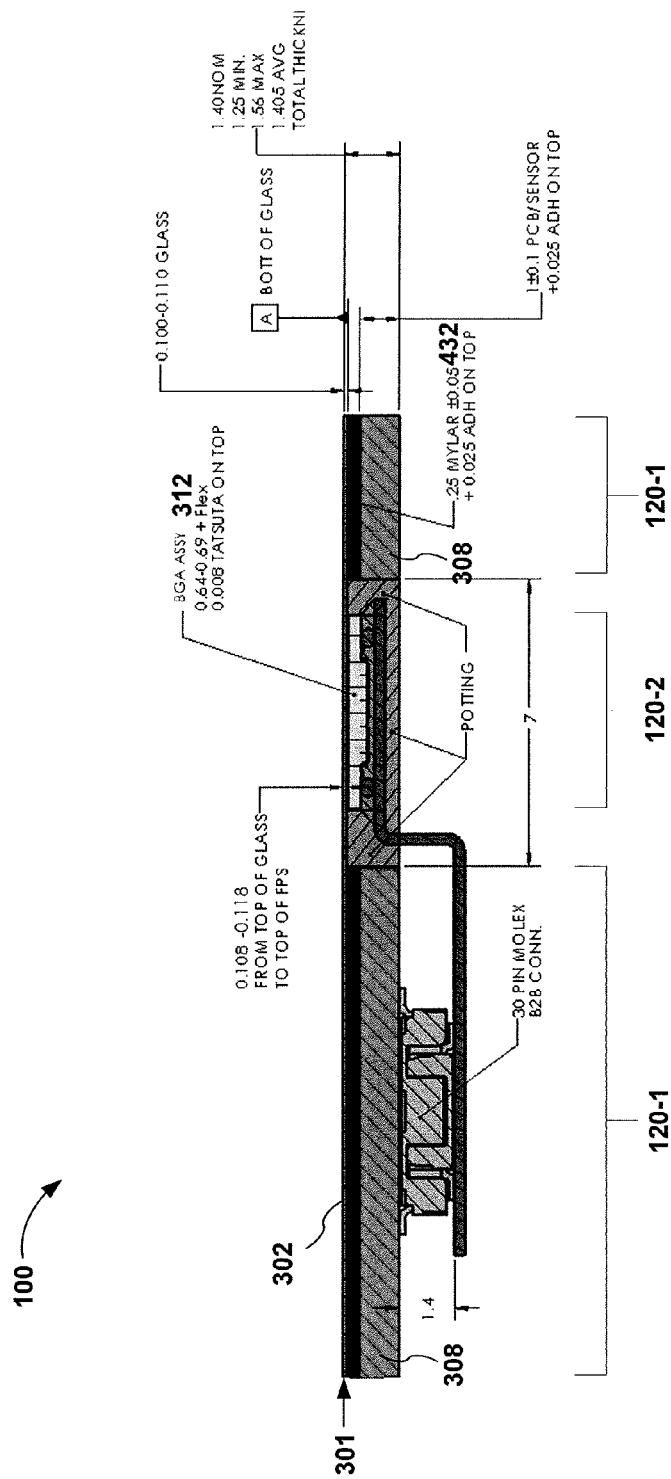
FIG. 4 is another profile view of an example input device, according to an embodiment of the current disclosure.

Turning to FIG. 4, another embodiment similar to that in FIG. 3 is shown. In the current embodiment, an input device 100 is provided which combines the functionality of a proximity sensor and a fingerprint sensor. Specifically, the input device 100 comprises a glass cover layer 301 having a thickness of 0.10-0.30 millimeters. In the proximity sensing region (i.e., area 120-1) a layer of Mylar™ 432 or PET film having a thickness of about 0.25 millimeters is adhered to the bottom of the glass substrate 301. In the fingerprint sensing region (i.e., area 120-2) the layer of PET and adhesive used for the proximity sensing region (i.e., area 120-1) may or may not be present.

FIG. 4 also shows various exemplary dimensions. As shown in the figure, an 8 micron adhesive layer ("TATSUTA™") on top of the fingerprint sensor 312 adheres the fingerprint sensor to the glass cover 301, whereas a thicker 25 micron adhesive layer ("ADH") on top of the PCB touch sensor 308 adheres the PCB touch sensor 308 to the glass cover 301. The adhesive layer used in the fingerprint sensing area 120-2 may be of the same type or of a different type from the adhesive layer used in the proximity sensing area 120-1. In this example, a layer of Mylar™ 432 or PET film is included, so the touch sensor 308 is adhered to the glass cover 301 through this intervening film, which is itself adhered directly to the bottom surface of the glass cover 301 using an additional 25 micron of adhesive layer.

Figure 5:
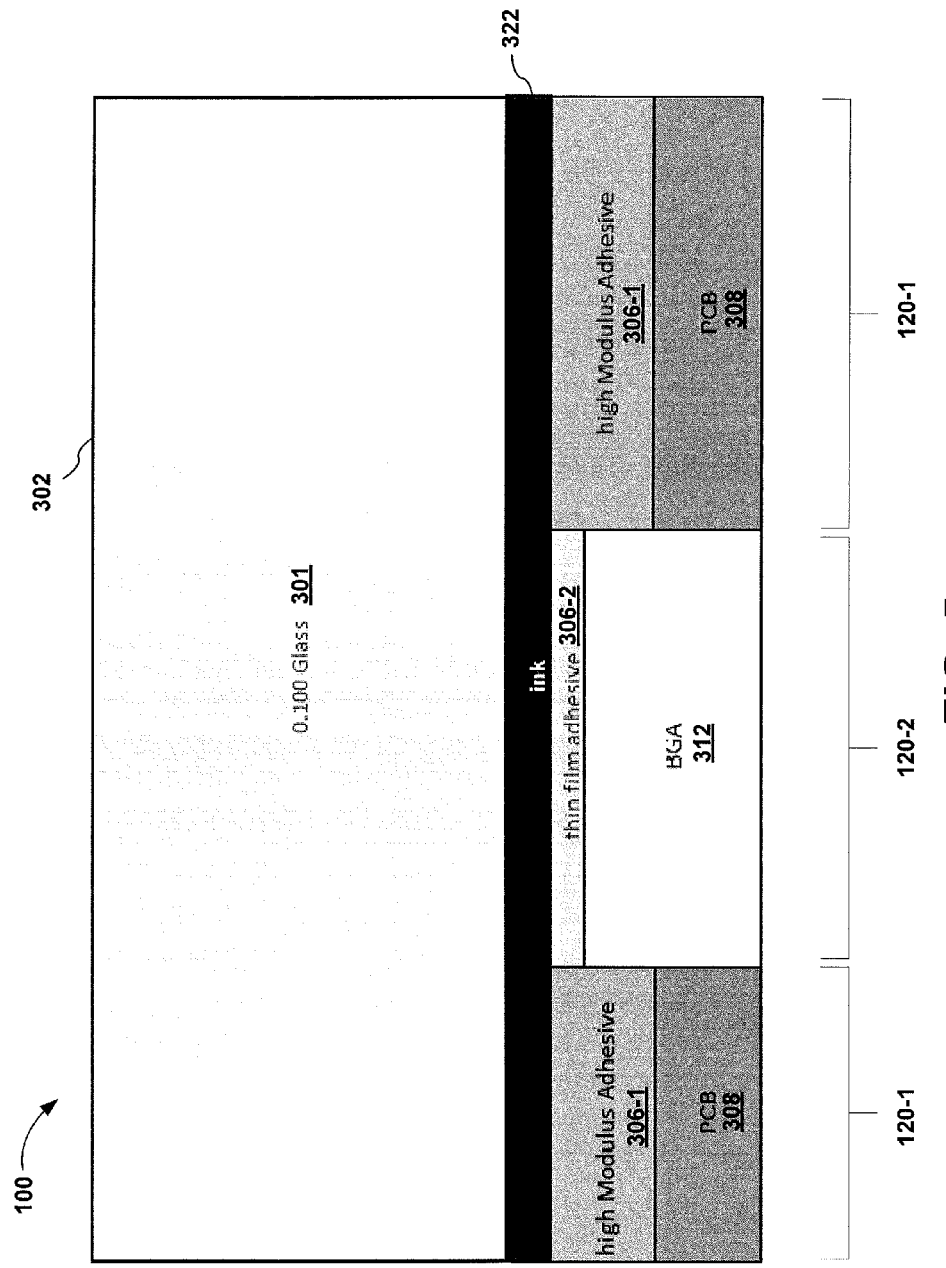
FIG. 5 is an example construction of a combined proximity and fingerprint sensor, according to an embodiment of the current disclosure.

In one embodiment as shown in FIG. 5, the cover layer 301 ("0.100 Glass") and ink layer 322 ("ink") extends across the complete sensing area, where the ink layer 322 is printed on the backside (i.e., bottom surface) of the glass cover layer 301. The touch sensor electrodes formed in a printed circuit board 308 ("PCB") are adhered to the bottom surface of the cover layer 301 using an adhesive layer 306-1 positioned in the proximity sensor area 120-1. The proximity sensor adhesive layer 306-1 includes a High Modulus Adhesive (i.e., having greater than about 250 MPa). The fingerprint sensor 312 is mounted within an aperture formed in the PCB layer 308 using an adhesive layer 306-2 positioned in the fingerprint sensing area 120-2. The fingerprint sensor adhesive 306-2 in the fingerprint sensing area 120-2 includes a thin film adhesive (or a liquid adhesive) of 10-25 microns thickness. As previously stated, the High Modulus Adhesive has low shrinkage properties and a low CTE (coefficient of thermal expansion).

As shown in FIG. 5, a 0.10-0.30 millimeter glass cover layer 301, together with the adhesive layer 306-2 in the fingerprint sensing area, provides a sufficiently thin thickness for the fingerprint sensor to obtain adequate measurements of biometric information for a finger in contact with the input surface 302. As shown in FIG. 5, the adhesive layer 306-2 in the fingerprint area 120-2 is thinner than the adhesive 306-1 in the proximity sensor area 120-1. However, the glass 301 is susceptible to cracking or breaking because of its thinness. The use of a High Modulus adhesive relieves this potential durability problem: the higher adhesive modulus assists the back material (PCB) to be in tension. The net result is the front thin glass is not in tension as much as it would be if the adhesive between the front glass and backer were material with low modulus. The higher adhesive modulus is necessary to transfer the kinetic energy from a blunt force acted upon the glass to the other bonded surface.

It should be understood that the particular dimensions may vary. For example, in FIG. 5 the adhesive layer 306-2 that adheres the fingerprint sensor is 10-25 microns thick, while in FIG. 4 the adhesive layer that adheres the fingerprint sensor ("TATSUTA") is 8 microns thick. Moreover, while FIGS. 4 and 5 both depict embodiments in which the adhesive layer in the fingerprint area 120-2 is thinner than the adhesive layer in the proximity sensor area 120-1, in some embodiments it is possible for these adhesive layers to have uniform thickness across the entire input device sensing area, e.g., as shown in FIG. 3.

Figure 6A:
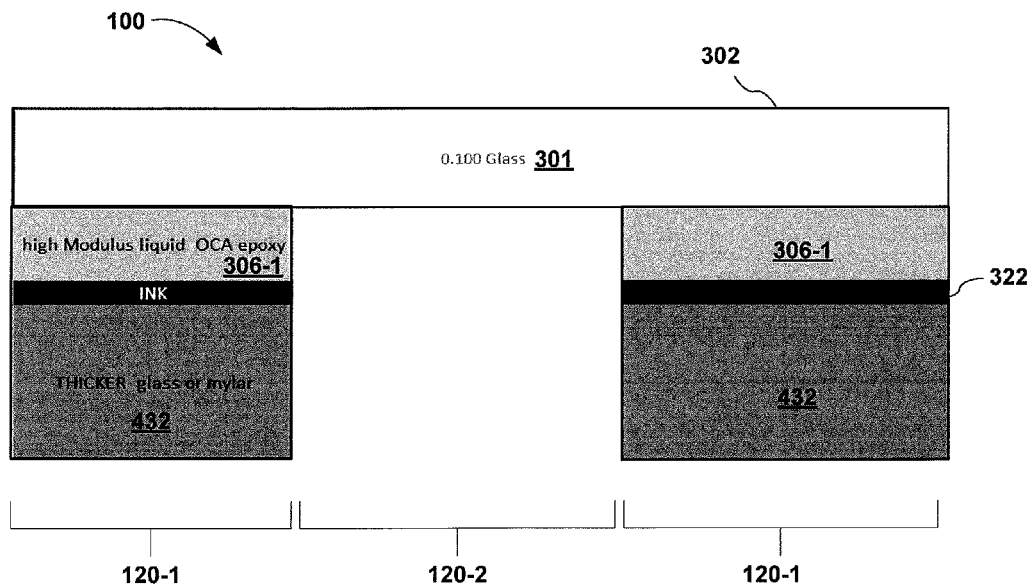
FIGS. 6A-6B are example constructions of a combined proximity and fingerprint sensor, according to embodiments of the current disclosure.
Figure 6B:
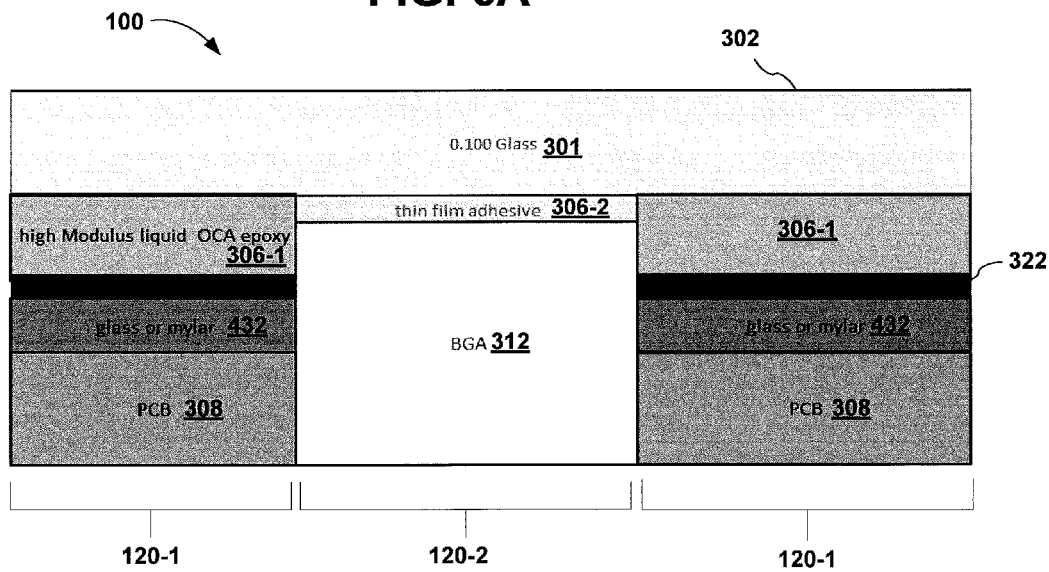

As shown in FIGS. 6A-6B, alternate assemblies of the input device 100 remove the ink 322 from the area 120-2 where the fingerprint sensor 312 ("BGA") is mounted. In FIG. 6A, the "ink" layer 322 is printed on the top side of a "Thicker Glass or Mylar™" 432 (i.e., PET Film). This substrate comprises an aperture similar to the aperture found in the PCB layer 308. Like in the embodiments above, an adhesive 306-1 in the proximity sensing area 120-1 includes a High Modulus Adhesive ("High Modulus Liquid OCA epoxy"). In this example, this adhesive 306-1 couples the glass substrate 301 and the "Thicker Glass or Mylar™" 432. The presence of the High Modulus Adhesive with low shrinkage and CTE properties provides rigidity to the glass cover layer 301 to prevent cracking or breaking of the glass substrate.

As shown in FIG. 6B, an additional layer of glass or PET Film 432 ("THICKER glass or Mylar™") is disposed between cover layer 301 ("0.100 Glass") and the touch sensor PCB 308. An ink layer 322 is disposed on the additional glass or PET Film 432 ("Mylar™") layer. These layers provide additional structural rigidity to the input device 100, a pleasant cosmetic appearance and functionality (i.e., the PCB 308 comprises sensor electrodes for proximity sensing).

According to embodiments of the present disclosure, a method for constructing an input device is disclosed. The method comprises providing a thin glass layer (e.g., 100-300 micron glass substrate) and adhering a PET Film layer to the glass using an adhesive. In some embodiments, the adhesive comprises one of a PSA (Pressure Sensitive Adhesive), an ultraviolet light cured epoxy, a liquid epoxy. In some embodiments, the adhesive is a high modulus adhesive having a stiffness of at least 250 MPa. In some embodiment, the adhesive is about 8-12 microns thick. In some embodiments, the adhesive layer is about 20-50 microns thick. In some embodiments, an ink is deposited on the backside (bottom surface) of the glass cover. In some embodiments, an ink is deposited on the PET Film layer. In some embodiments, an ink is deposited on a second glass layer beneath the input surface.

In some embodiments, the PET Film Layer and/or adhesive has an aperture or cavity where a fingerprint sensor can be later disposed. In some embodiments, the PET Film can be a uniform substrate without a cavity and the fingerprint sensor can be coupled to the PET Film with a thin film adhesive (either high modulus or low modulus). A Printed Circuit Board ("PCB") having proximity sensor electrode traces is coupled to the assembly using a High Modulus Adhesive (according to embodiment of FIG. 5) or a low modulus adhesive (according to embodiments of FIGS. 6A-6B, which is not shown in the figures but can be used to couple the PCB to the glass or Mylar™ 432). A fingerprint sensor is disposed in the cavity formed by the PCB substrate (and in some embodiments, the PET Film substrate). The fingerprint sensor can be secured using an encapsulation material that hardens to secure the sensor to the top and side substrates.

In some embodiments, the fingerprint sensor is coupled to a processing system of the input device using a Flexible Printed Cable (FPC). In some embodiments, the fingerprint processing system is mounted on the back of the PCB. In some embodiments, the fingerprint sensor is coupled to the processing system via the PCB.

Figure 7:
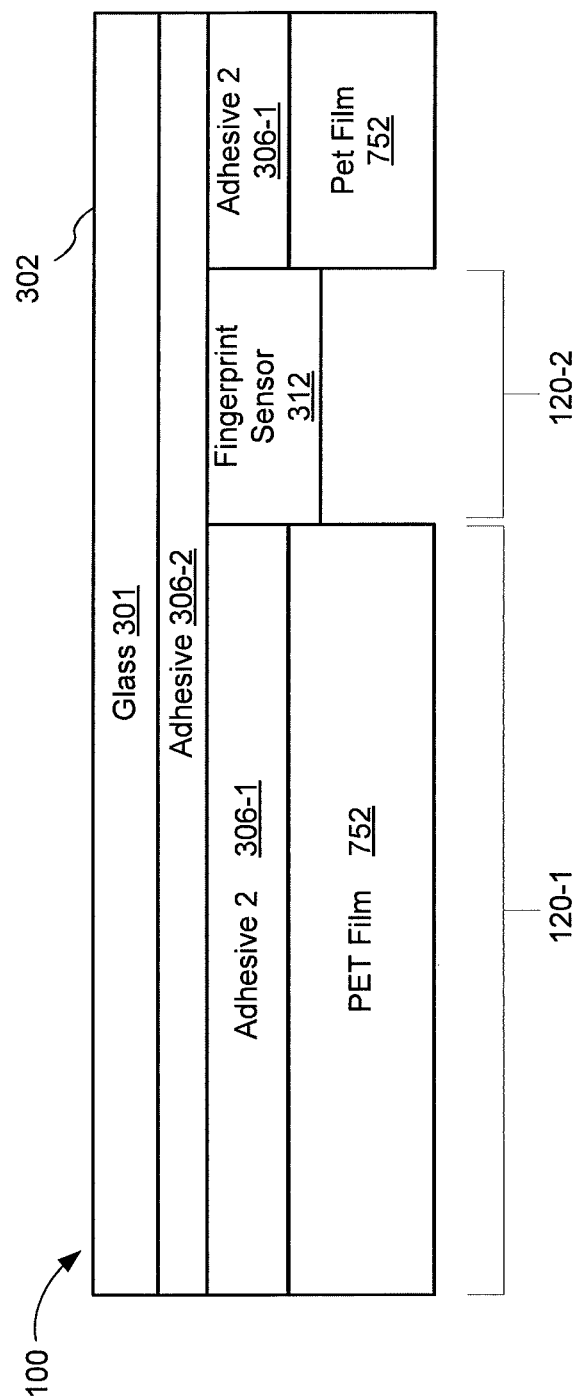
FIG. 7 is an example view of an input device, according to one embodiment of the current disclosure.

In another embodiment, shown in FIG. 7, the input device 100 comprises two layers of adhesive disposed beneath the cover layer 301 ("Glass"). The cover layer has a thickness of about 0.1 to 0.4 millimeters. In one embodiment, the first adhesive layer 306-2 may comprise a thickness of about 0.05 to 0.2 millimeters and the second layer of adhesive 306-1 may comprise a thickness of about 0.4 to 0.7 millimeters. The first layer of adhesive 306-2 extends across the whole area of the input surface 301 including the region above the fingerprint sensor 312 (fingerprint sensing area 120-2). The second layer of adhesive 306-1 does not extend across the whole area and comprises an aperture where the fingerprint sensor 312 is disposed. Additionally, a PET Film layer 752 is disposed beneath the second layer of adhesive 306-1. The PET Film may be optically clear (i.e., comprise no opaque inking layer) or may have an inking layer only in a part of the PET Film layer.

In an embodiment according to FIG. 8, the input device 100 may further comprise a display device 862 disposed under part of the cover layer 301. The PET film 752 has a region with an inking layer to provide opaqueness outside of the sensing region which overlaps the display area (outside of the active area of the display device 862, which overlaps with the proximity sensing area 120-1). The embodiments presented in FIGS. 7 and 8 may comprise adhesive layers having a High Modulus (i.e., having greater than about 250 MPa) and low shrinkage and CTE properties. In the regions overlapping the display, the adhesive is an Optically Clear Adhesive (OCA) while in the regions outside of the display, the adhesive may be opaque or transparent.

In some embodiments, a stiffener is coupled to the back of the fingerprint sensor. The stiffener may solely cover the fingerprint sensor or may extend along to overlap some of the PCB to provide additional stiffness to the input device assembly. In some embodiments, the potting ("underfill & encapsulation") material also comprises a High Modulus (i.e., having greater than about 250 MPa) and low shrinkage and CTE properties.

Thus, the embodiments and examples set forth herein were presented in order to best explain the present disclosure and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed. Those skilled in the art will also appreciate that various features from different embodiments and examples set forth herein may be combined, modified, and/or used together without departing from the scope of the present disclosure.

The invention claimed is:

1. An input device for fingerprint sensing and proximity sensing, the input device comprising:
   a glass cover layer, wherein a top surface of the glass cover layer is configured to provide an input surface for a finger;
   a printed circuit board disposed below the glass cover layer, the printed circuit board comprising a cavity;
   a fingerprint sensor disposed below the glass cover layer and disposed in the cavity of the printed circuit board layer;
   a first adhesive layer disposed between a top surface of the fingerprint sensor and a bottom surface of the glass cover layer, the first adhesive layer being disposed in a fingerprint sensing area that is within an area of the cavity; and
   a second adhesive layer disposed between a top surface of the printed circuit board and the bottom surface of the glass cover layer, the second adhesive layer being disposed in a proximity sensing area that is outside of the area of the cavity.

2. The input device of claim 1, wherein the second adhesive layer has a Young's modulus greater than about 250 MPa.

3. The input device of claim 2, wherein the second adhesive layer comprises an optically clear liquid epoxy adhesive having a Young's modulus greater than 250 MPa.

4. The input device of claim 1, wherein the second adhesive layer comprises a liquid adhesive, and wherein the first adhesive layer comprises a thin film adhesive or a liquid adhesive.

5. The input device of claim 1, wherein the first adhesive layer disposed in the fingerprint sensing area is thinner than the second adhesive layer disposed in the proximity sensing area.

6. The input device of claim 1, wherein the second adhesive layer comprises an aperture in the fingerprint sensing area, wherein the first adhesive layer is disposed in the aperture of the second adhesive layer.

7. The input device of claim 1, further comprising:
   an ink layer disposed between the bottom surface of the glass cover layer and the top surface of the printed circuit board.

8. The input device of claim 7, wherein the ink layer is disposed between the bottom surface of the glass cover layer and the second adhesive layer.

9. The input device of claim 7, wherein the second adhesive layer is disposed between the bottom surface of the glass cover layer and the ink layer.

10. The input device of claim 7, wherein the ink layer is disposed on the bottom surface of the glass cover layer.

11. The input device of claim 7, wherein the ink layer is disposed in the proximity sensing area and the fingerprint sensing area.

12. The input device of claim 7, wherein the ink layer is disposed in the proximity sensing area, and wherein the fingerprint sensing area is free of the ink layer.

13. The input device of claim 1, wherein the printed circuit board comprises an array of touch sensor electrodes.

14. The input device of claim 1, wherein the glass cover layer has a thickness between 0.10 millimeters and 0.30 millimeters.

15. The input device of claim 1,
   wherein the second adhesive layer comprises a liquid adhesive having a Young's modulus greater than 250 MPa;
   wherein the first adhesive layer comprises a liquid adhesive;
   wherein the first adhesive layer is thinner than the second adhesive layer; and
   wherein the glass cover layer has a thickness between 0.10 millimeters and 0.30 millimeters.

16. The input device of claim 1,
   wherein the first adhesive layer and the second adhesive layer are adhered to a bottom surface of the glass cover layer and have a Young's modulus greater than 250 MPa; and
   wherein the first adhesive layer is thinner than the second adhesive layer.

17. An input device for fingerprint sensing and proximity sensing, the input device comprising:
   a cover layer, wherein a top surface of the cover layer is configured to provide an input surface for a finger;
   a substrate disposed below the cover layer, the substrate comprising a cavity;
   a fingerprint sensor disposed below the cover layer and disposed in the cavity of the substrate;
   a first adhesive layer disposed between a top surface of the fingerprint sensor and a bottom surface of the cover layer, the first adhesive layer being disposed in a fingerprint sensing area that is within an area of the cavity; and
   a second adhesive layer disposed between a top surface of the substrate and the bottom surface of the cover layer, the second adhesive layer being disposed in a proximity sensing area that is outside of the area of the cavity.

18. The input device of claim 17, wherein the substrate comprises a PET film.

19. The input device of claim 17, further comprising:
a display device disposed below the substrate,
wherein the substrate comprises a film, wherein a first area of the film is disposed in an active area of the display device, and wherein the first area of the film is optically clear.

20. The input device of claim 19, wherein a second area of the film is disposed outside of the active area of the display device, wherein the second area of the film is opaque.

21. The input device of claim 19, wherein the fingerprint sensor is disposed outside of the active area of the display device.

22. The input device of claim 17, wherein the first adhesive layer extends across the fingerprint sensing area and the proximity sensing area, wherein the second adhesive layer extends across the proximity sensing area, and wherein the fingerprint sensing area is free of the second adhesive layer.

23. The input device of claim 17, wherein the first adhesive layer extends across the fingerprint sensing area, wherein the proximity sensing area is free of the first adhesive layer, wherein the second adhesive layer extends across the proximity sensing area, and wherein the fingerprint sensing area is free of the second adhesive layer.

24. The input device of claim 17, wherein the first adhesive layer disposed in the fingerprint sensing area is thinner than the second adhesive layer disposed in the proximity sensing area.

25. The input device of claim 17,
wherein the first adhesive layer and the second adhesive layer are adhered to a bottom surface of the cover layer and have a Young's modulus greater than 250 MPa; and
wherein the first adhesive layer is thinner than the second adhesive layer.

* * * * *